United States Patent Office 3,053,594
Patented Sept. 11, 1962

3,053,594
HOLLOW PISTON
Larkin R. Williamson, 304 S. Main St., Red Springs, N.C.
Filed June 1, 1959, Ser. No. 817,285
6 Claims. (Cl. 309—4)

This application, relating as indicated to a piston, is more particularly directed to a novel structure for a piston, in a reciprocating type positive displacement, high pressure hydraulic pump or compressor, said pump being of a type that does not use packing and uses special means for taking the thrust from the piston in displacement of the hydraulic fluid. The invention herein resides in the construction of the piston itself, which is of a hollow construction either of a closed end or an open end structure adapted particularly for sealing a piston in a cylinder to prevent leakage of fluid or gas between the piston and the cylinder wall in which it reciprocates.

This invention further relates to a combination of a piston of hollowed out construction for high pressure hydraulic pumps and compressors of positive displacement type, together with a cylinder wall construction which is relatively non-expansible and in which the cylinder wall has variations or grooving, particularly in a radial plane, of some fraction of the diametral clearance between the piston and the wall.

In the art of high pressure hydraulic pumps to develop pressures particularly above the order of 10,000 pounds per square inch, and a general range of 10,000 p.s.i. to 50,000 p.s.i., or perhaps even 100,000 p.s.i., there is a need for a special type of piston to pump fluids. These pistons may be of large cross-sectional area and hollow, of either a closed end or open end type. In solid pistons, perhaps of steel or of equivalent materials, there would be insufficient axial stress per unit of area to cause the necessary action with the side walls to accomplish the sealing of the piston. To cause these pistons to bulge and to provide proper clearance and sealing action between the piston and the cylinder wall for these pressures, it is necessary to hollow out the piston head. This may be done by having an axial bore in the piston. The said hollowed-out piston of open end type may then have a loose fitting steel plug in the end in order to reduce the volumetric capacity of the cylinder, which would lower the volumetric efficiency of the pump due to the compressibility of the fluid being pumped.

Another type of construction would be a closed end piston in which the piston was hollowed out from the zero pressure end or driving end of the piston and because of its nature and the reduced radial cross-sectional area, the piston would bulge outwardly because of the axial stress as the fluid is pumped or displaced.

An object of this invention is to produce a hollow piston for high pressure displacement pumps and compressors.

A further object of this invention is to produce a piston of special construction having a cavity in the center portion thereof to induce a diametral bulge of the piston as the piston operates in the high pressure hydraulic medium.

To the accomplishment of the foregoing and related ends, said invention, then consists of the means hereinafter fully described and particularly pointed out in the claims; the following description setting forth in detail one approved method of carrying out the invention, such method, however, constituting but one of the various ways in which the principal of the invention may be used.

In the drawings:
FIG. 1 is a fragmentary cross-sectional view through the piston and cylinder wall,
FIG. 2 is a cross-sectional fragmentary view through the piston and cylinder when subjected to pressure, causing bulging of the piston and a reduction of the clearance,
FIG. 3 is an alternate modification of FIG. 1 and is a fragmentary cross-sectional view of a closed head type piston, and
FIG. 4 is a greatly enlarged cross-sectional view of the piston cylinder surfaces.

In the drawings 10 indicates a cylinder wall of the high pressure hydraulic pump. Said cylinder wall is relatively non-expansible as compared with said piston. At one end there is an enlarged portion 11 from the bore of the cylinder 12, and a piston 13 is shown in said bore. On the left are means, not shown, for advancing the said piston at periodic intervals. The pumps may be, of course, of multiple cylinders and of varying sizes, depending upon the various factors subsequently to be described. This piston has a cylinder wall 15 and an end portion, which is shown in one species in FIG. 1 and FIG. 2, and still another species in FIG. 3, i.e., in FIGS. 1 and 2 the piston has an open head, that is, there is a free passage of the fluid along said head past the major portion of the piston cylinder wall 15. However, at the end thereof there might be a loose plug, perhaps of steel, as designated at 16, so that the capacity of the fluid in the cylinder and in the enlarged portion of the bore of the cylinder would not affect the volumetric efficiency of the pump. However, the pressure from compressed fluid in the enlarged portion of the bore of the cylinder would be transmitted by means of the loose fitting block to the lateral wall of the hollow piston.

In connection with FIG. 3 there is shown a closed end piston 17, said piston having wall portions 18 and an end 19.

There is a cylinder block 20 in said view having a cylinder wall 21. Said block and wall are relatively non-expansible as compared with said piston. The piston extends into an enlarged bore 22 and reciprocates in the cylinder wall and the enlarged bore. While the forces acting on the open end and the closed end piston will be somewhat different, as will be subsequently described, both of these pistons are capable of the diametral bulge by the nature of their construction and the forces to which they are subjected.

It was once thought that the barreling action of the piston shown in FIGS. 1 and 2 was the result of pressure fluid acting within the cavity in the piston. This is partially correct in that the portion of the piston extending outwardly of the cylinder wall 10 and into the atmosphere is expanded due to the differential in ambient pressure and the pressure within the cavity. With regard to that portion of the piston contained within the cylinder 11, however, the bulging action is probably not due to the pressure acting upon the lateral walls of the piston inasmuch as the pressure in the hollow cavity and the pressure in the cylinder 11 are equal.

The bulging or expanding action of the portion of the piston contained within the cylinder is now felt to be the result of pressure acting upon the end face of the piston. That is to say upon the plug 16 in FIGS. 1 and 2, which although loosely mounted, is nevertheless capable of transmitting axial force to the lateral wall of the piston. In high pressure pumps of the type with which the instant piston is employed, the piston is accelerated very rapidly. Because of this high acceleration the piston is advanced into the cylinder with a hammer-like action at a very high Sept. 11, 1962     L. R. WILLIAMSON     3,053,594
HOLLOW PISTON
Filed June 1, 1959
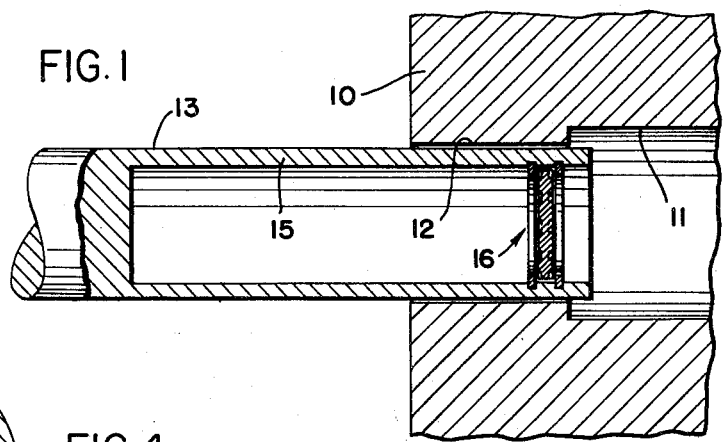
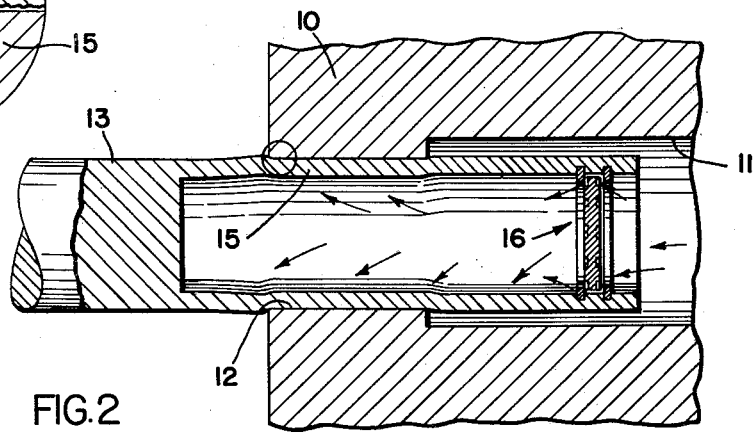
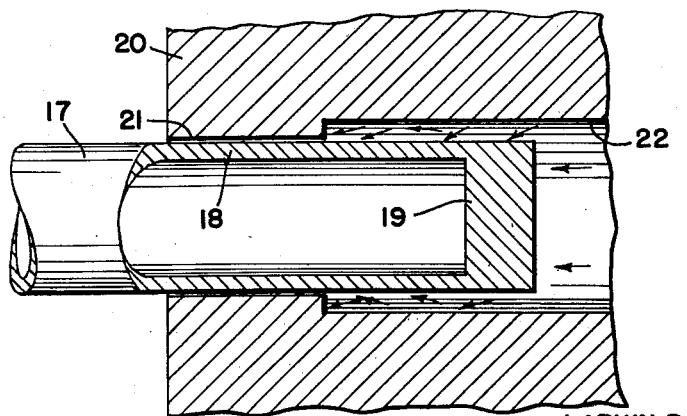
INVENTOR.
BY LARKIN R. WILLIAMSON
*Fay & Fay*
ATTORNEYS cylinder into the enlarged bore and reciprocates therein.

6. The high pressure hydraulic pump of claim 1, in which the hollow piston has a uniform wall thickness over a major portion of the piston which is adjacent to the relative non-compressible cylinder, whereby the pressure on the piston causes a diametral bulge of equal amount circumferentially on the piston whereby said bulge reduces the clearance between the piston and the cylinder wall below the point at which the fluid would leak under the conditions involved.

References Cited in the file of this patent

UNITED STATES PATENTS

| | | |
|---|---|---|
| 1,283,800 | Kestner | Nov. 5, 1918 |
| 2,161,143 | Doe | June 6, 1939 |
| 2,168,850 | Towler et al. | Aug. 8, 1939 |
| 2,633,202 | Hartsell | Mar. 31, 1953 |
| 2,674,950 | Underwood | Apr. 13, 1954 |
| 2,730,960 | Krause | Jan. 17, 1956 |
| 2,735,735 | Abel | Feb. 21, 1956 |